(12) United States Patent
Mazzocco

(10) Patent No.: US 9,636,975 B2
(45) Date of Patent: May 2, 2017

(54) HOUSING FOR VEHICULAR HVAC SYSTEM AND DUAL HVAC SYSTEM

(71) Applicants: DENSO International America, Inc., Southfield, MI (US); DENSO CORPORATION, Kariya, Aichi-pref. (JP)

(72) Inventor: Nicholas Mazzocco, Clawson, MI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 284 days.

(21) Appl. No.: 14/640,454

(22) Filed: Mar. 6, 2015

(65) Prior Publication Data

US 2015/0251516 A1 Sep. 10, 2015

Related U.S. Application Data

(60) Provisional application No. 61/949,340, filed on Mar. 7, 2014, provisional application No. 61/949,346, filed on Mar. 7, 2014.

(51) Int. Cl.
*B60H 1/32* (2006.01)
*B60H 1/00* (2006.01)

(52) U.S. Cl.
CPC . *B60H 1/3233* (2013.01); *B60H 2001/00214* (2013.01)

(58) Field of Classification Search
CPC ........ B60H 1/0037; B60H 2001/00235; F25B 39/02; F24F 13/20
USPC ...... 62/404, 244, 285; 165/42; 454/152, 159
See application file for complete search history.

(56) References Cited

U.S. PATENT DOCUMENTS

| | | | | |
|---|---|---|---|---|
| 6,021,957 A | * | 2/2000 | Takechi | B60H 1/00842 165/42 |
| 6,138,749 A | * | 10/2000 | Kawai | B60H 1/00064 165/204 |
| 6,244,335 B1 | * | 6/2001 | Nakamura | B60H 1/00028 165/203 |

(Continued)

FOREIGN PATENT DOCUMENTS

| KR | 10-2010-0016743 | 2/2010 |
|---|---|---|
| KR | 10-2010-0097511 | 9/2010 |

OTHER PUBLICATIONS

International Search Report and Written Opinion dated May 20, 2015 in corresponding PCT Application No. PCT/US2015/019233 (11 pages).

*Primary Examiner* — Melvin Jones
(74) *Attorney, Agent, or Firm* — Harness, Dickey & Pierce, P.L.C.

(57) ABSTRACT

A housing for a vehicle HVAC system includes a case and a drainage port that drains fluid from the case of the housing. The drainage port includes a spout and defines a first fluid passage and a second fluid passage. An outlet of the first fluid passage and an outlet of the second fluid passage may be adjacent to each other at the spout. The first fluid passage fluidly couples a first region of the case to the spout, and the second fluid passage fluid fluidly couples a second region of the case to the spout. Based on the pressure of the first region and the second region, fluid flowing through the first fluid passage or the second fluid passage accelerates at the outlet of the respective passage to form a vacuum at the spout.

19 Claims, 5 Drawing Sheets

(56) References Cited

U.S. PATENT DOCUMENTS

| | | |
|---|---|---|
| 6,415,857 B1 | 7/2002 | Nakamura et al. |
| 2006/0053818 A1 | 3/2006 | Yoshida |
| 2010/0212347 A1 | 8/2010 | Kim et al. |
| 2010/0304654 A1 | 12/2010 | Kakizaki et al. |

* cited by examiner

HOUSING FOR VEHICULAR HVAC SYSTEM AND DUAL HVAC SYSTEM

CROSS-REFERENCE TO RELATED APPLICATIONS

This application claims the benefit of U.S. Provisional Application No. 61/949,340 filed on Mar. 7, 2014 and U.S. Provisional Application No. 61/949,346 filed on Mar. 7, 2014. The entire disclosures of the above applications are incorporated herein by reference.

FIELD

The present disclosure relates to a housing for a vehicular heating, ventilation and air conditioning (HVAC) system.

BACKGROUND

This section provides background information related to the present disclosure which is not necessarily prior art. A vehicle may include a dual heating, ventilation and air conditioning (HVAC) system for conditioning the air in a passenger cabin of the vehicle. For instance, the dual HVAC system includes one HVAC system dedicated for the front passenger compartment and a second HVAC system dedicated for the rear passenger compartment. The dual HVAC system heats and cools air blown through respective HVAC systems using a heating heat exchanger (i.e., a heater core) and/or a cooling heat exchanger (i.e., an evaporator). The dual HVAC system has two independently operated systems that have essentially the same components, and can be disposed adjacent to each other.

As the HVAC system(s) operates, water condensation from the components begin to collect. A drainage port is usually provided as part of the housing of the HVAC system for discharging fluid, such as water and air, from the housing. The dual HVAC system includes a separate drainage port for each of the systems.

With the rising cost of material, there is a need to reduce the cost and complexity of such dual HVAC systems. Development in dual HVAC systems has led to integrated components, which are components utilized for both HVAC systems (e.g., integrated evaporator). However, when developing integrated components, it is important that the two HVAC systems continue to operate independently from one another. Furthermore, the operation of one HVAC system should not affect the performance of the other HVAC system.

SUMMARY

This section provides a general summary of the disclosure, and is not a comprehensive disclosure of its full scope or all of its features. The present disclosure provides for a housing for a heating, ventilation, and air conditioning HVAC system for a vehicle. The housing includes a case and a drainage port. The case may include a first region and a second region. The drainage port includes a spout and defines a first fluid passage and a second fluid passage. An outlet of the first fluid passage and an outlet of the second fluid passage may be adjacent to each other at the spout. The first fluid passage fluidly couples the first region of the case to the spout, and the second fluid passage fluid fluidly couples the second region of the case to the spout. Fluid flowing through the first fluid passage may accelerate at an outlet of the first fluid passage to form a vacuum at the spout in response to the first region having a higher pressure than the second region. The vacuum formed by the high velocity fluid through the first fluid passage draws fluid from the second region to the spout by way of the second fluid passage. Similarly, fluid flowing through the second fluid passage may accelerate at the outlet of the second fluid passage to form a vacuum at the spout in response to the second region having a higher pressure than the first region. The vacuum formed by the high velocity fluid through the second fluid passage draws fluid from the first region to the spout by way of the first fluid passage.

In yet in another aspect, the present disclosure provides for a housing for a HVAC system for a vehicle. The HVAC system includes an evaporator that has a core member. The housing includes a drainage port that aligns that with a first portion of the core member. The drainage port includes a spout and defines a first fluid passage and a second fluid passage. An outlet of the first fluid passage and an outlet of the second fluid passage are adjacent to each other at the spout. The first fluid passage aligns with the first portion of the core to fluidly couple the first portion of the core to the spout. The second fluid passage fluid fluidly couples fluid from a second portion of the core member to the outlet of the first fluid passage such that fluid from the second fluid passage accelerates at the outlet of the second fluid passage to form a vacuum at the outlet of the first fluid passage. That is, the second portion of the core member is a high pressure area of the evaporator and fluid from the high pressure area flows through the second fluid passage and forms low pressure area at the outlet of the first fluid passage. The low pressure area at the outlet of the first fluid passage draws fluid from the first portion of the core member through the first fluid passage to the spout.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
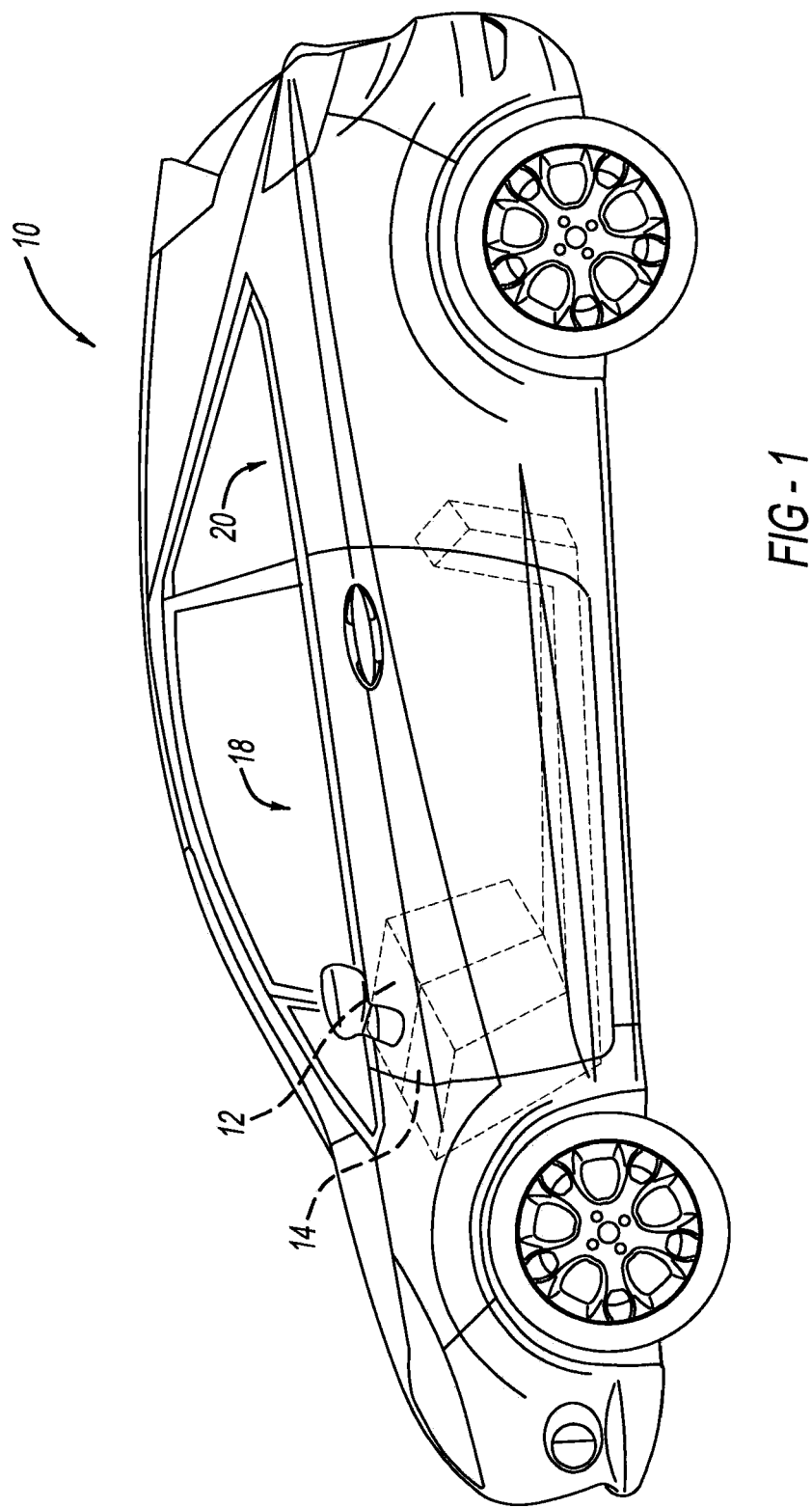
FIG. 1 illustrates a vehicle having a front HVAC system and a rear HVAC system.

The present disclosure will now be described more fully with reference to the accompanying drawings. With reference to FIG. 1, a vehicle 10 having a dual heating, ventilation, and air conditioning (HVAC) system is presented. The vehicle 10 includes a front HVAC system 12 and a rear HVAC system 14. The front HVAC system 12 and the rear HVAC system 14 may be referred to as the HVAC systems 12 and 14. The HVAC systems 12 and 14 are disposed within an engine compartment of the vehicle 10 and are positioned behind a dashboard of the vehicle 10. The HVAC systems 12 and 14 heat and/or cool air within a passenger compartment of the vehicle 10. The front HVAC system 12 heats and cools a front cabin 18 and the rear HVAC system 14 heats and cools the rear cabin 20. While the present disclosure discusses primary components of the HVAC systems 12 and 14, it is understood that other components may be needed for the overall operation of the HVAC systems 12 and 14.

Figure 2:
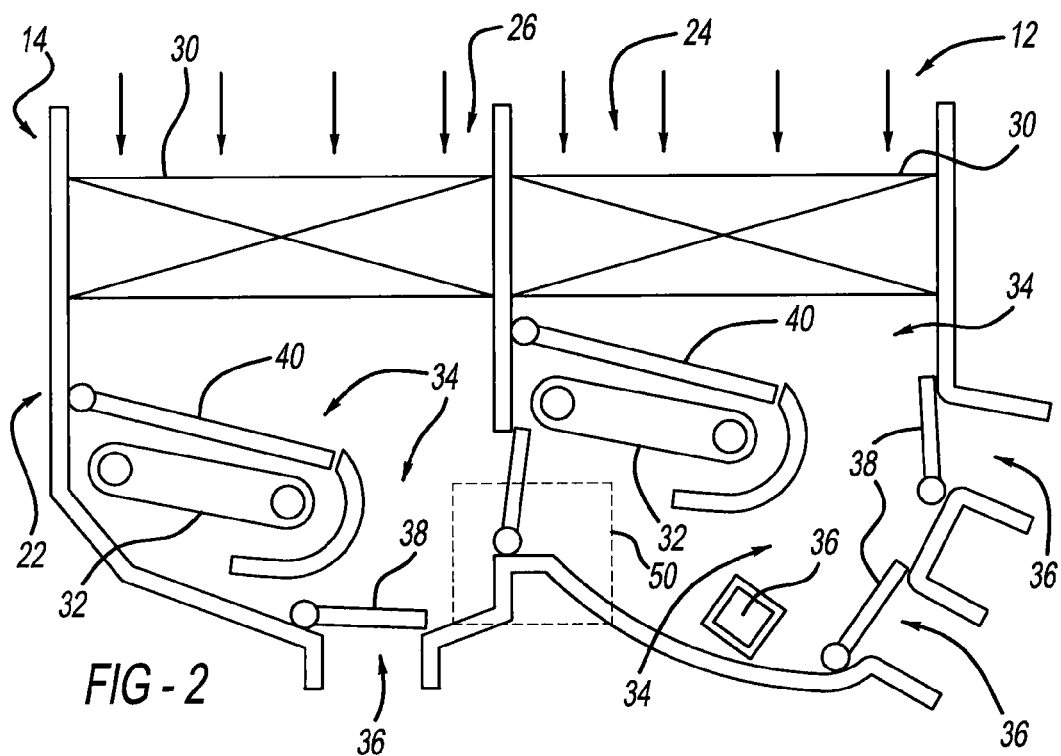
FIG. 2 illustrates the front HVAC system and the rear HVAC system within a housing having a drainage port of the present disclosure.

FIG. 2 illustrates a portion of the HVAC systems 12 and 14, which are positioned next to each other. The HVAC systems 12 and 14 include the same components, and are housed in a housing 22. The housing 22 includes multiple pieces that are coupled together via mechanical fasteners and/or adhesives. The housing 22 may be formed out of resin such as polypropylene. The housing 22 defines a front HVAC chamber 24 for housing the front HVAC system 12 and a rear HVAC chamber 26 for housing the rear HVAC system 14. The front HVAC chamber 24 is separated from the rear HVAC chamber 26, such that the two HVAC systems 12 and 14 operate independently from each other. Specifically, the housing 22 fluidly seals the HVAC systems 12 and 14 from each other to prevent fluid, such as water and/or air, from being exchanged between the systems 12 and 14. In the following description, information related to the components and operation of the HVAC system 12 is also applicable to the HVAC system 14.

The HVAC system 12 includes a blower unit (not shown), an evaporator 30, and a heater core 32. The front HVAC chamber 24 defines multiple air passages 34 in which the air is conditioned before being blown into the front cabin 18 via one or more outlets 36. The outlets 36 are coupled to the air vents (not shown) disposed in the front cabin 18. The outlets 36 are closed/opened by one or more doors 38.

The blower unit draws in air into the HVAC system 12 from the outside. The air drawn in by the blower unit flows through the evaporator 30. The evaporator 30 is a heat exchanger and cools air flowing through the evaporator 30, as is known in the art. The heater core 32 is positioned downstream from the evaporator 30 in an air flow direction. The amount of air entering the heater core 32 is controlled via one or more doors 40. The heater core 32 heats the air flowing through the heater core 32. The air flowing from the evaporator 30 and/or the heater core 32 flows through the air passages 34 where it is conditioned to a desired temperature before entering the front cabin 18. Likewise, with regard to the rear HVAC system 14, the air flowing from the evaporator 30 and/or the heater core 32 flows through the air passages 34 where it is conditioned to a desired temperature before entering the rear cabin 20. In the example embodiment, the HVAC systems 12 and 14 are each provided with an evaporator 30. Alternatively, the HVAC systems 12 and 14 may share an integrated evaporator.

As the HVAC systems 12 and 14 operate, water condensates on the components, such as the evaporators 30. To discharge the water condensation from the HVAC systems 12 and 14, the housing 22 includes a drainage port 50 for removing fluid, such as water and/or air, from the housing 22 to the vehicle exterior.

Figure 3:
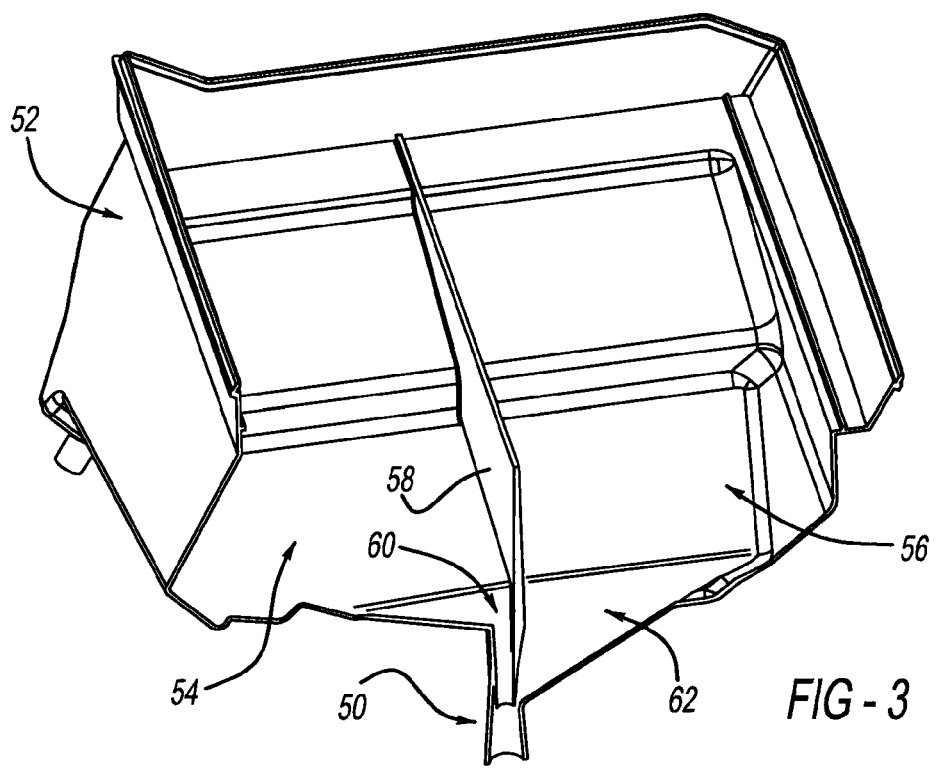
FIG. 3 is a partial cross-sectional view of a case having the drainage port.

FIG. 3 illustrates a partial cross-sectional view of a case 52 having the drainage port 50. The case 52 is one of the pieces that make up the housing 22. The case 52 forms a portion of the front HVAC chamber 24 and the rear HVAC chamber 26. For example, the case 52 has a first region 54 and a second region 56 that are separated by a partition 58. The first region 54 forms a portion of the rear HVAC chamber 26 and the second region 56 forms a portion of the front HVAC chamber 24.

The case 52 may include mouth sections 60 and 62 at the first region 54 and the second region 56, respectively, for connecting the case 52 to the drainage port 50. The mouth sections 60 and 62 are depicted as having a tapered shape for directing fluid from the casing 52 to the drainage port 50.

Figure 4:
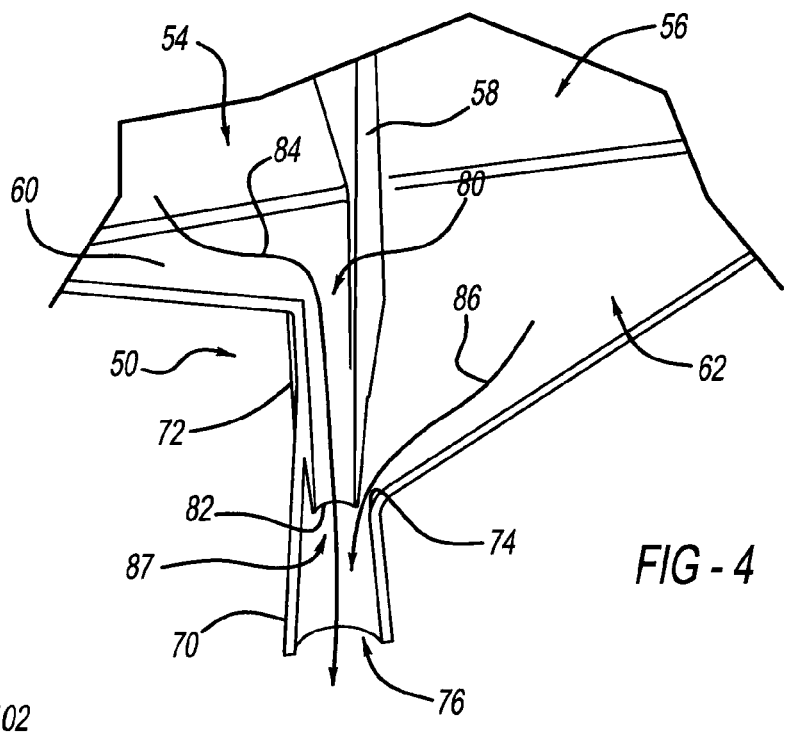
FIG. 4 is an expanded view of the drainage port of FIG. 3.

Referring to FIG. 4, the drainage port 50 includes a spout 70 and a conduit member 72, and defines an orifice 74. Fluid from the housing 22 is discharged via an opening 76 defined by the spout 70.

The conduit member 72 fluidly couples the first region 54 and the spout 70, and defines an inlet 80 and outlet 82. The conduit member 72 is disposed between the mouth section 60 of the first region 54 and the spout 70, such that the inlet 80 is connected to the mouth section 60 and the outlet 82 is connected at the spout 70. The conduit member 72 and the mouth section 60 form a first fluid passage 84 through which fluid travels from a first area defined by the mouth section 60 to a second area defined by the conduit member 72 of the drainage port 50. The second area defines a narrower path than the first area, such that a velocity of the fluid is higher at the outlet 82 of the conduit member 72 than at mouth section 60 or at the inlet 80. For example, the conduit member 72 may have a smaller diameter or width than the mouth section 60.

In the example embodiment, the conduit member 72 has a substantially uniform shape in which the diameter is constant throughout. Alternatively, the conduit member 72 may have a varying shape in which the diameter of the inlet 80 is greater than the diameter of the outlet 82. For example, the conduit member 72 may have a funnel-like shape, a cone-like shape, or other suitable shape that generates a higher fluid velocity at the outlet 82 than at the inlet.

The orifice 74 may be positioned substantially adjacent to or downstream of the outlet 82 of the conduit member 72. The orifice 74 fluidly couples the second region 56 of the housing 22 and may be referred to as an auxiliary passage. In the example embodiment, the mouth section 62 tapers toward the spout 70 and the outlet 82 is defined between the mouth section 62 and the spout 70. The mouth section 62, and the orifice 74 define a second fluid passage 86. As fluid passes through the second fluid passage 86, the velocity of the fluid increases such that a velocity of the fluid is higher at the orifice 74 than at the wider portion of the mouth section 62. In an alternative configuration, the drainage port 50 may include another conduit member for coupling the second region 56 to the spout 70. For example, the mouth section 62 may be configured like the mouth section 60. An auxiliary conduit member may be disposed adjacent to the conduit member 72 and may have an inlet coupled to the second region 56 and an outlet coupled at the spout 70. The outlets of the conduit member 72 and the auxiliary conduit member may be disposed next to each other at the spout 70.

The drainage port 50 creates a suction to draw out fluid from a non-operating HVAC system in order to prevent fluid from collecting in the housing holding the non-operating HVAC system. For instance, if the rear HVAC system 14 is operating and the front HVAC system 12 is not operating, the first region 54 has a lower air pressure than the second region 56. A suction or vacuum is created at an area 87 (i.e., at the orifice 74 and the outlet 82) by the flow of fluid through the second fluid passage 86, where the fluid is accelerated as it travels through the orifice 74. The suction at the area 87 draws fluid from the first region 54 (i.e., low pressure non-operating side) through the conduit member 72. Similarly, if the rear HVAC system 14 is not operating and the front HVAC system 12 is operating, the first region 54 has a higher air pressure than the second region 56. A suction is created at the area 87 by the flow of fluid through the first fluid passage 84, where the flow of fluid accelerates as it travel through the conduit member 72 and exits at the outlet 82. The suction at the area 87 draws fluid from the second region 56 (i.e., low pressure non-operating side) through the orifice 74.

The drainage port 50 discharges fluid, such as water accumulating in the rear HVAC chamber 26 and the front HVAC chamber 24, via a single drainage system. The increase in velocity created through the outlet 82 or the orifice 74 creates a low pressure area at the area 87, thereby generating a vacuum for pulling fluid from a region of the housing 22 having a non-operating HVAC.

In the example embodiment, the drainage port 50 is utilized for a housing that houses both HVAC systems 12 and 14. Alternatively, when the HVAC systems 12 and 14 are disposed adjacent to each other in separate housing, the case having the drainage port 50 may be configured between the two housings to have the housings share the same drainage port.

Figure 5:
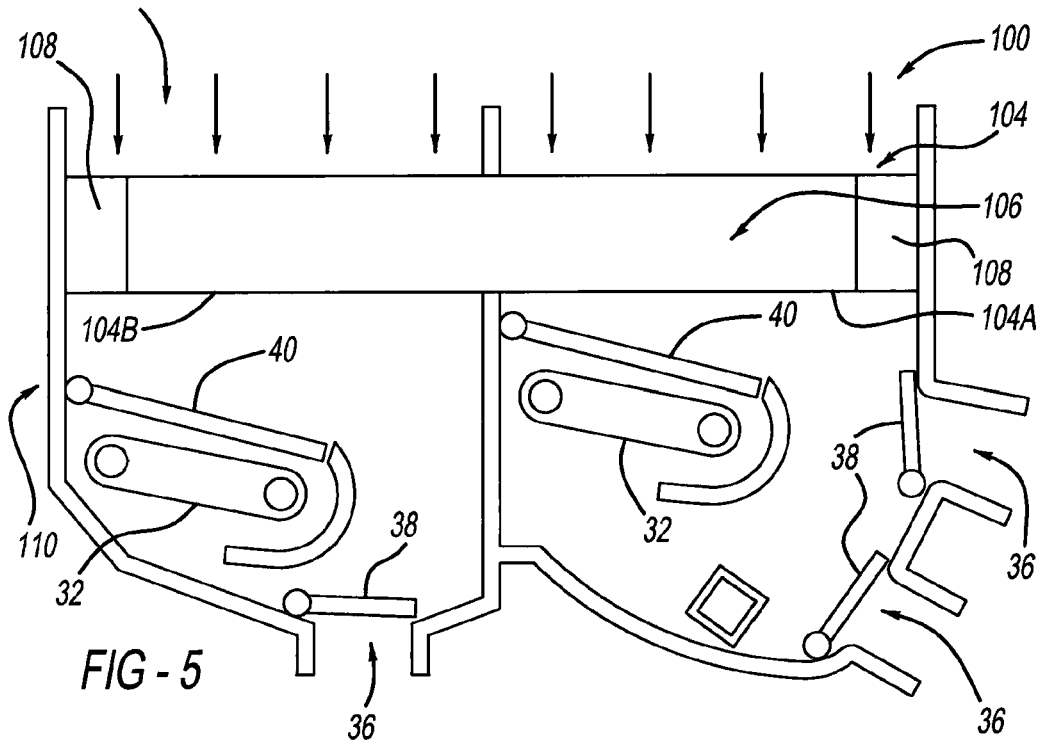
FIG. 5 illustrates a front HVAC system and a rear HVAC system utilizing an integrated evaporator.

The drainage port of the present disclosure may also drain water from a high pressure area of an integrated evaporator that is utilized for both the rear and front HVAC systems. Specifically, with reference to FIG. 5, a front HVAC system 100 and a rear HVAC system 102 share an integrated evaporator 104 that has a first portion 104A for the front HVAC system 100, and a second portion 104B for the rear HVAC system 102. The evaporator 104 further includes a core member 106 disposed between header tanks 108. The HVAC systems 100 and 102 are disposed in a housing 110, and function in a similar manner as the HVAC systems 12 and 14.

Figure 6:
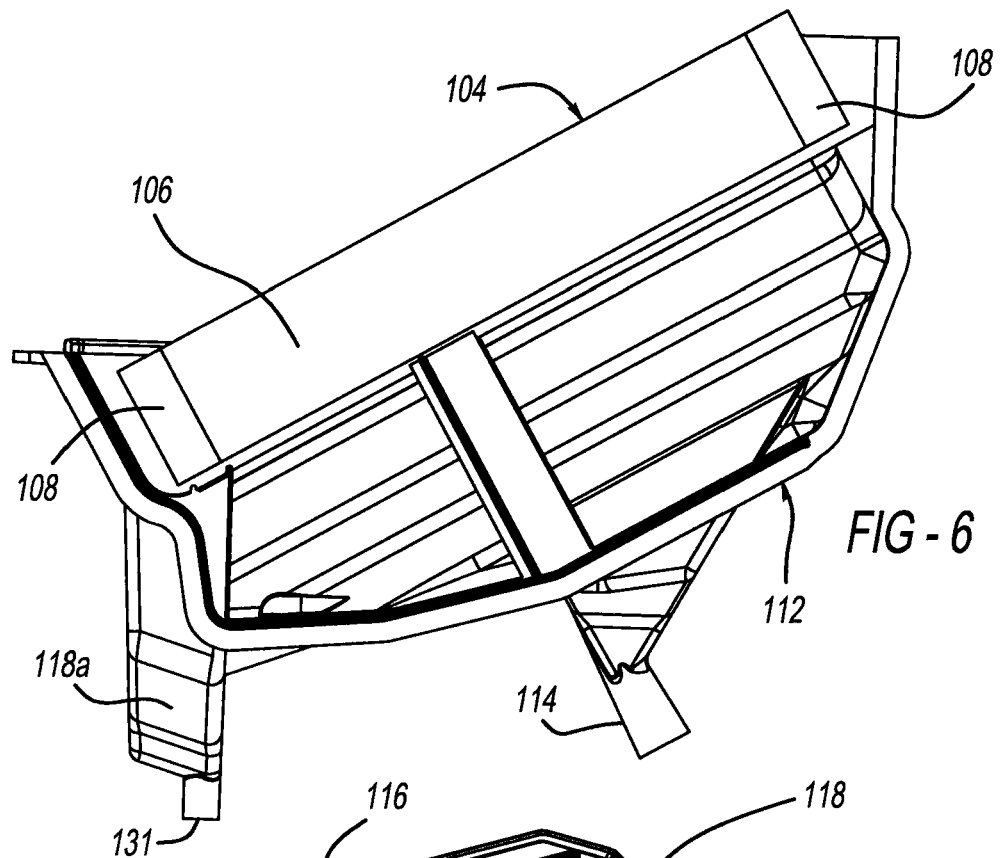
FIG. 6 is a perspective view of the integrated evaporator disposed in a case having a drainage port in a second embodiment of the present disclosure.
Figure 7:
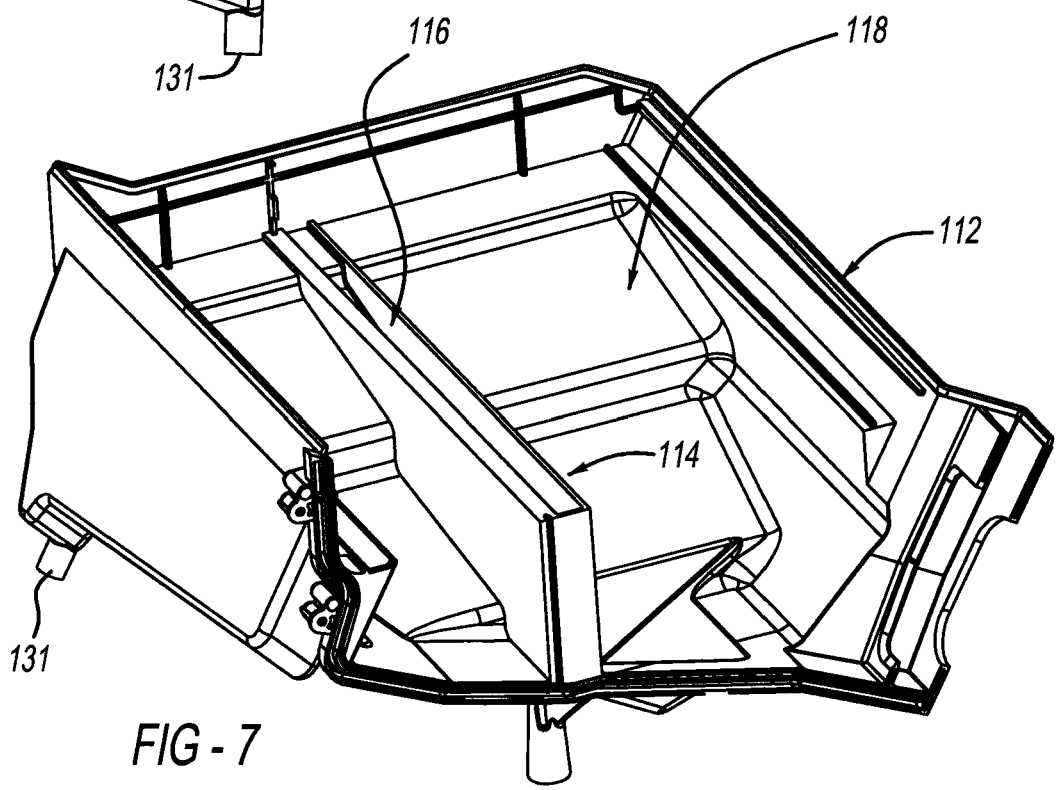
FIG. 7 is perspective view of the case of FIG. 6.

With reference to FIG. 6, the evaporator 104 is disposed in a case 112 which includes a drainage port 114. The case 112 is part of the housing 110. As shown in FIG. 7, the drainage port 114 includes a suction region 116 disposed within a main chamber 118. The suction region 116 aligns with a portion of the core member 106 of the evaporator 104. The suction region 116 of the drainage port 114 may have other suitable configuration in which the suction region 116 aligns with the core member 106 to pull fluid from the evaporator 104.

Figure 8:
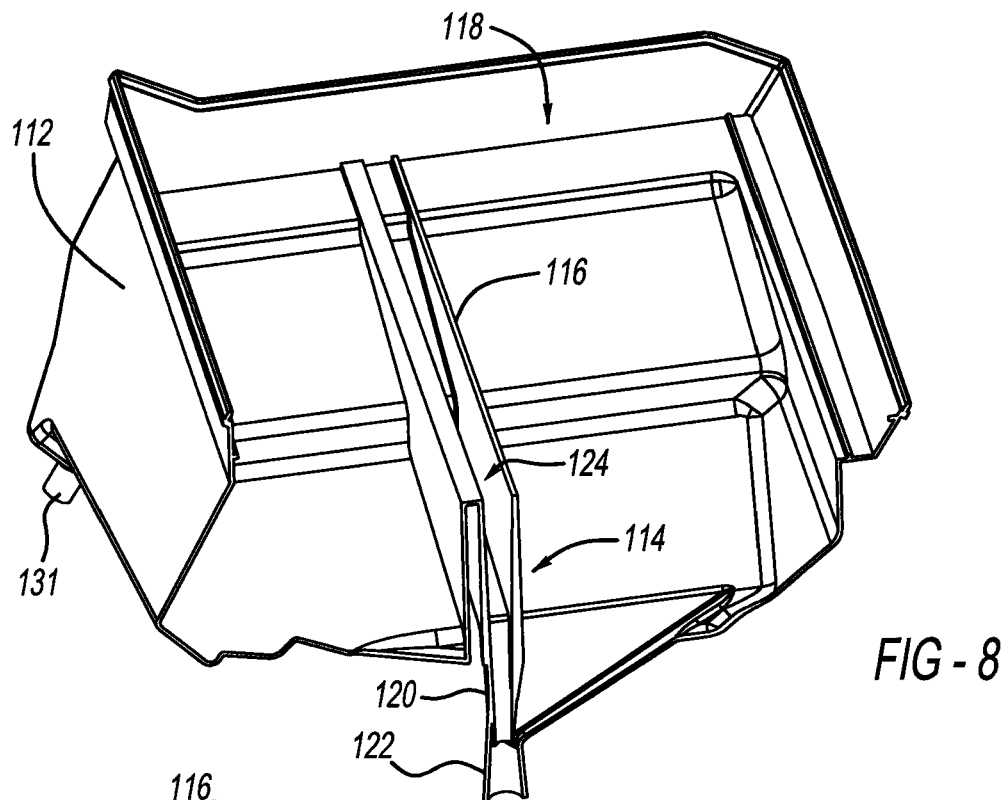
FIG. 8 is a partial cross-sectional view of the case of FIG. 7.
Figure 9:
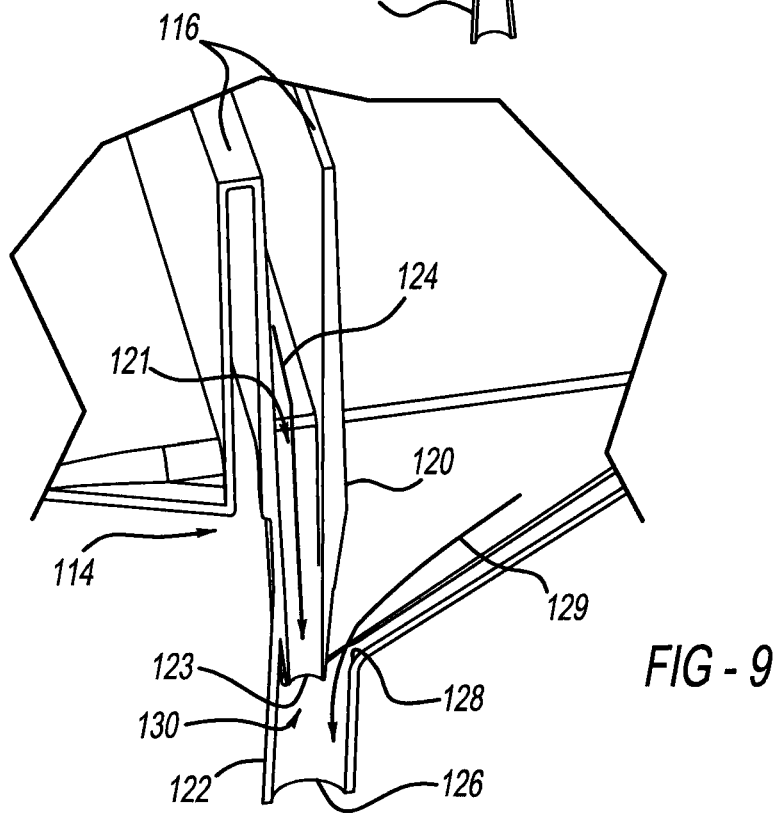
FIG. 9 is an expanded view of the drainage port of FIG. 8.

With reference to FIGS. 8 and 9, in addition to the suction region 116, the drainage port 114 includes a conduit member 120 and a spout 122. The conduit member 120 defines an inlet 121 that is connected at the suction region 116 and an outlet 123 that is connected at the spout 122. The suction region 116 and the conduit member 120 define a first fluid passage 124 that extends along the core member 106 and to the spout 122. In the example embodiment, the first fluid passage 124 has a substantially uniform shape in which the width of the first fluid passage 124, as defined by the suction region 116 and the conduit member 120, is substantially constant throughout. Alternatively, the first fluid passage 124 may have a varying shape such that the first fluid passage 124 tapers to a smaller width at the spout 122. For example, the width of the first fluid passage 124 may be greater along the suction region 116 than at the conduit member 120.

The drainage port 114 further includes an orifice 128 defined adjacent to or downstream of the outlet 123 of the conduit member 120. A second fluid passage 129 is defined by the orifice 128 to connect the spout 122 to a high pressure area of the main chamber 118. High velocity fluid from the main chamber 118 enters the spout 122 at the outlet 123 by way of the second fluid passage 129 creating a vacuum at an area 130 of the spout 122, which is substantially at the outlet 123 of the conduit member 120. The suction created by the high velocity fluid, pulls water from the core member 106 through the first fluid passage 124.

The core member 106 of the evaporator 104 is a high pressure area. At times, water condensing along the core member 106 may not be able to flow toward a low pressure area, such as near the header tanks 108 of the evaporator 104. Therefore, water may be trapped within the evaporator 104, which affects the performance of the evaporator 104. In particular, the first fluid passage 124 and the suction created at the area 130 by the high velocity fluid from the second fluid passage 129 creates a low pressure area at the core member 106 of the evaporator 104, thereby drawing fluid from the high pressure area of the core member 106 to the low pressure area of the first fluid passage 124.

Water collecting at the header tanks 108 flows down to the main chamber 118 and is discharged by way of an exit 131. Water collecting in the main chamber 118 may also be discharged by way of the orifice 128 of the drainage port 114. That is, water in the main region 118 flows through the orifice 128 and is discharged from the spout 122. Other suitable methods may be used to discharge water collecting in the main chamber 118. As an example, the case 112 may include a separate drain to expel water from the main region 118.

In the example embodiment, the front HVAC system 100 and the rear HVAC system 102 share the evaporator 104. During the operation of the front HVAC system 100 and/or the rear HVAC system 102, water condensation begins to form on the evaporator 104. Due to the configuration of the evaporator 104, water may not be able to flow from the high pressure area along the core member 106 of the evaporator 104 to the low pressure area, which is along the sides of the evaporator 104. The drainage port 114 creates a low pressure area for drawing water along the high pressure area. Accordingly, the water condensation is removed from the evaporator 104 without affecting the operation of the evaporator 104, and, furthermore, the performance of the HVAC systems 100 and 102.

While the drainage port 114 of the present disclosure is described as part of a dual HVAC system having an integrated evaporator, the drainage port 114 may also be used with a single HVAC system having an evaporator or a dual HVAC system where the front HVAC system and the rear HVAC system each have an evaporator. For instance, the drainage port 114 may be provided for each evaporator of the dual HVAC system for removing water accumulating in the core member.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components and devices, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A housing for a heating, ventilation, and air conditioning HVAC system for a vehicle, the housing comprising:
   a case housing components of the HVAC system, wherein the case includes a first region and a second region; and
   a drainage port draining fluid from the HVAC system, the drainage port including a spout and a conduit member, and defining an orifice, wherein
   the conduit member defines a first fluid passage that fluidly couples the first region of the case to the spout,
   the orifice is defined between the second region of the case and the spout, and is adjacent to an outlet of the conduit member, the orifice defines a second fluid passage to fluidly couple the second region to the spout at the outlet of the conduit member,
   fluid flowing through the first fluid passage accelerates through the outlet of the conduit member to form a vacuum at the outlet of the conduit member in response to the first region having a higher pressure than the second region, and
   fluid flowing through the second fluid passage accelerates through the orifice to form the vacuum at the outlet of the conduit member in response to the second region having a higher pressure than the first region.

2. The housing of claim 1 wherein the conduit member has a funnel like shape.

3. The housing of claim 1 wherein:
   the case houses an evaporator of the HVAC system, the first region of the case houses a first portion of a core of the evaporator, and the second region of the case houses a second portion of the core,
   the drainage port includes a suction region that connects to the conduit member, the suction region is located at the first region of the case and aligns with the first portion of the core, and the suction region and the conduit member define the first fluid passage, and
   the second region of the case has higher pressure than the suction region of the drainage port such that fluid accelerates through the orifice of the second fluid passage to form the vacuum at the outlet of the conduit member.

4. The housing of claim 1 wherein:
   the first region includes a first mouth section that tapers toward the drainage port and couples to the conduit member, and the conduit member has a cross-sectional area that is smaller than the first mouth section, and
   the second region includes a second mouth section that tapers toward the spout of the drainage port, and the orifice is defined between the second mouth section and the spout.

5. A housing for a dual heating, ventilation, and air conditioning HVAC system for a vehicle, the dual HVAC system including a first HVAC system and a second HVAC system, the dual HVAC system conditioning air for a front compartment and a rear compartment of the vehicle, the housing comprising:
   a first chamber housing the first HVAC system;
   a second chamber housing the second HVAC system, the second chamber being different from the first chamber, wherein the first chamber and the second chamber are fluidly sealed from each other; and
   a drainage port draining fluid from the first chamber and from the second chamber, the drainage port having a spout, a conduit member, and an auxiliary passage, wherein
   the spout discharges fluid from the dual HVAC system,
   the conduit member fluidly couples the first chamber to the spout, the conduit member defines an inlet coupled to the first chamber and an outlet coupled to the spout, the conduit member and the first chamber define a first fluid passage that has a first area adjacent to the inlet and a second area adjacent to the outlet, the second area is smaller than the first area, and
   the auxiliary passage defines an orifice between the second chamber and the spout, the auxiliary passage defines a second fluid passage to fluidly couple the second chamber to the spout at the outlet of the conduit member,
   fluid flowing through the first fluid passage accelerates through the outlet of the conduit member to form a vacuum at the outlet of the conduit member in response to the first chamber having a higher pressure than the second chamber, and
   fluid flowing through the second fluid passage accelerates through the orifice to form the vacuum at the outlet of the conduit member in response to the second chamber having a higher pressure than the first chamber.

6. The housing of claim 5 wherein the orifice is defined substantially adjacent to the outlet of the conduit member.

7. The housing of claim 5 wherein fluid flowing through the first fluid passage of the conduit member accelerates at the outlet and forms the vacuum in response to the first HVAC system operating.

8. The housing of claim 5 wherein fluid flowing through the second fluid passage of the auxiliary passage accelerates at the orifice and forms the vacuum in response to the second HVAC system operating.

9. The housing of claim 5 wherein the conduit member has a funnel like shape.

10. The housing of claim 5 wherein the auxiliary passage includes an auxiliary conduit member that defines an inlet, the inlet of the auxiliary conduit member couples to the second chamber and the orifice couples to the spout, the auxiliary conduit member and the second chamber define the second fluid passage that has a first area adjacent to the inlet of the auxiliary conduit member and a second area adjacent to the orifice of the auxiliary conduit member, and the second area is smaller than the first area.

11. The housing of claim 10 wherein the outlet of the conduit member and the orifice of the auxiliary conduit member are adjacent to each other at the spout.

12. The housing of claim 5 wherein the first chamber includes a mouth section that tapers toward the drainage port and couples to the conduit member at the inlet.

13. The housing of claim 5 wherein the second chamber includes a mouth section that tapers toward the spout of the drainage port, and the orifice is defined between the mouth section and the spout.

14. A dual heating, ventilation, and air conditioning HVAC system for a vehicle, the system comprising:
the housing of claim 5;
a first HVAC system conditioning air for a front compartment of the vehicle; and
a second HVAC system conditioning air for a rear compartment of the vehicle.

15. A housing for a heating, ventilation, and air conditioning HVAC system for a vehicle, the HVAC system including an evaporator have a core member, the housing comprising:
a drainage port aligns with a first portion of the core member, the drainage port includes a spout and defines a first fluid passage and a second fluid passage, wherein
an outlet of the first fluid passage and an outlet of the second fluid passage are adjacent to each other at the spout,
the first fluid passage aligns with the first portion of the core to fluidly couple the first portion of the core to the spout, and
the second fluid passage fluid fluidly couples fluid from a second portion of the core member to the outlet of the first fluid passage such that fluid from the second fluid passage accelerates at the outlet of the second fluid passage to form a vacuum at the outlet of the first fluid passage.

16. The housing of claim 15 wherein:
the drainage port includes a suction section and a conduit member and defines an orifice,
the suction section is connected to a first end of the conduit member and the orifice is defined adjacent to a second end of the conduit member opposite to the first end,
the suction section aligns with the first portion of the core member of the evaporator,
the suction section and the conduit member define the first fluid passage, and the second end of the conduit member includes the outlet of the first fluid passage, and
the orifice defines the second fluid passage such that fluid from the second portion of the core member accelerates at the orifice to form the vacuum at the second end of the conduit member.

17. The housing of claim 15 wherein:
the drainage port includes a suction section and a conduit member, and defines an orifice,
the suction section aligns with the first portion of the core member,
the conduit member defines an inlet that couples to the suction section and the outlet of the first fluid passage,
the suction section and the conduit member define the first fluid passage that extends along the first portion of the core member to the outlet of the conduit member, and
the orifice is defined adjacent to the outlet of the conduit member to define a second fluid passage that fluidly couples fluid from the second portion of the core member to the outlet of the conduit member, and
the second fluid passage has a higher flow velocity at the orifice than the first fluid passage at the outlet of the conduit member such that the second fluid passage forms the vacuum at the outlet of the conduit member to draw fluid from the first portion of the core member by way of the first fluid passage.

18. A dual HVAC system comprising:
the housing of claim 15;
a front HVAC system conditioning air for a front passenger compartment of the vehicle;
a rear HVAC system conditioning air for a rear passenger compartment of the vehicle; and
an integrated evaporator conditioning air for the front HVAC system and the rear HVAC system, wherein the drainage port of the housing aligns with the integrated evaporator.

19. A dual HVAC system comprising:
a front HVAC system conditioning air for a front passenger compartment of the vehicle, wherein the front HVAC system includes a first evaporator;
a rear HVAC system conditioning air for a rear passenger compartment of the vehicle, wherein the rear HVAC system includes a second evaporator; and
the housing of claim 15, wherein the housing includes a plurality of the drainage ports such that each of the first and second evaporators align with a respective drainage port.

* * * * *